United States Patent [19]

Hurtle

[11] 3,735,309

[45] May 22, 1973

[54] VAPOR-STATE LIMITER WITH HIGH PRESSURE HOUSING

[75] Inventor: Ralph L. Hurtle, West Hartford, Conn.

[73] Assignee: General Electric Company, Plainville, Conn.

[22] Filed: Aug. 6, 1971

[21] Appl. No.: 169,680

[52] U.S. Cl. ..................337/21, 337/121, 337/248
[51] Int. Cl. ...............................................H01h 87/00
[58] Field of Search........................337/21, 114, 121, 337/122, 159, 248, 251, 252

[56] References Cited

UNITED STATES PATENTS

| | | | |
|---|---|---|---|
| 3,599,137 | 8/1971 | Itoh et al. | 337/114 |
| 3,117,203 | 1/1964 | Hurtle | 337/121 |
| 3,559,138 | 1/1971 | Itoh et al. | 337/21 |

*Primary Examiner*—Bernard A. Gilheany
*Assistant Examiner*—A. T. Grimley
*Attorney*—Robert T. Casey and Philip L. Schlamp

[57] ABSTRACT

A vaporizing-recondensing type current limiter including a main generally cylindrical ceramic body with at least one hole therethrough, filled with a low-melting point fuse metal. Terminal members and a strong metallic enclosing casing are included, together with insulating means for insulating at least one of the terminal members from the enclosing casing. The insulating means includes a generally cup-shaped insulating plastic cap with a hollow stem having its end tapered and received in wedged relation between a rod-shaped terminal member and a surrounding ring-shaped ceramic member.

2 Claims, 4 Drawing Figures

Patented May 22, 1973

3,735,309

INVENTOR
RALPH L. HURTLE
BY Robert S. Carey
ATTORNEY

VAPOR-STATE LIMITER WITH HIGH PRESSURE HOUSING

BACKGROUND OF THE INVENTION

U.S. Pat. No. 3,117,203 Hurtle, issued Jan. 7, 1964, to R.L. Hurtle and assigned to the same assignee as the present invention, discloses a novel vaporizing-recondensing, repetitively operable current limiting device. In the structure of the Hurtle patent, electrode members are brazed or bonded directly to a main ceramic body having at least one hole therethrough filled with a low melting point metal such as mercury, sodium, the alkali metals, potassium, etc.

Another form of vaporizing-recondensing current limiter is shown and described in 1EEE Conference Paper 70 CP 601–PWR, entitled "Permanent Power Fuse Self-Recovering Current Limiting Device."

In both of the above-mentioned structures, relatively short paths exist through the air or over the surface of an insulating body between at least one of the main electrodes and the metallic housing. This permits strike-over or voltage breakdown to occur when the device is in the process of interrupting a high current.

OBJECTS

It is an object of the invention to provide a vaporizing-recondensing current limiting device having the ability to withstand extremely high internal pressures during a current limiting operation without damage.

It is a further object of the invention to provide a current limiting device of the type described which includes improved insulating means for insulating the conductive components of the device so as to force current to be restrained to a path including the vaporized fuse metal during a current limiting operation and avoiding the occurrence of a fault or strike-over between conductive parts during such interruption.

It is another object of the invention to provide a current limiting device of the type described which includes a generally cylindrical supporting and enclosing housing and an elongated rod-like electrode projecting into said housing to an internal insulating body containing a fuse metal conductive path, which also includes simple and effective means for electrically insulating and spacing the rod-like electrode from the supporting and enclosing housing and preventing the occurrence of a fault or strike-over between these parts during a current limiting function.

It is a further object of the invention to provide a current limiting device of the type described in the foregoing object which precludes the occurrence of faults or strike-overs by relatively short paths extending through space directly or by paths extending over the surface of intervening insulating material.

SUMMARY OF THE INVENTION

In accordance with the invention in one form, a current limiting device is provided including an insulating body having at least one passage therethrough filled with a fuse metal and contained within a generally tubular metallic surrounding enclosure member and a pair of pluglike members closing the ends of the enclosure member. In accordance with the invention, the current limiting device includes a pair of generally rod-like electrodes projecting from the inner portion of the assembly to the outer portion, to provide connecting electrodes. The rod-like enclosures are spaced and insulated from the surrounding enclosure by means of specially pre-formed or molded insulating members cooperating with the other parts of the assembly to effectively close off any direct through-air or short over-surface path for electrical fault or strike-over. Clamping means is also provided for holding the insulating-spacing member in place and pressing it tightly against the cooperating parts.

DESCRIPTION OF A PREFERRED EMBODIMENT

Figure 1:
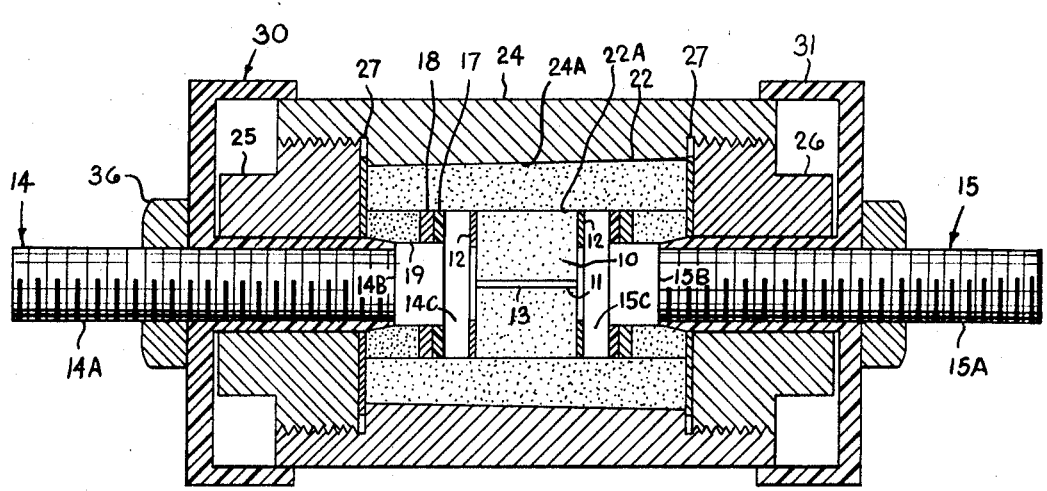
FIG. 1 is a longitudinal view of the invention in one form, with all parts except the incoming and outgoing electrodes shown in section.

Referring to FIG. 1, the invention is shown in one embodiment as comprising a central generally cylindrical ceramic body 10, having a central axial bore or passage 11. A pair of copper-clad stainless steel washers 12 are positioned against the ends respectively of the ceramic body 10.

For the purpose of bringing current into and out of the limiter, a pair of electrodes 14 and 15 are provided. The electrodes 14 and 15 each includes a main threaded stem portion 14A, 15A respectively, an enlarged unthreaded stem portion 14B, 15B, and an enlarged or flanged inner end portion 14C, 15C. The inner end portions 14C, 15C, of the electrodes 14, 15, are clamped against the ceramic insert 10, with the washers 12 between the parts as shown, by clamping means to be described.

The bore 11 in the ceramic member 10, and the spaces between the end walls of the ceramic member 10 and the inner ends of the electrodes 14, 15 exposed by the holes in the washers 12 are filled by a fusing metal 13. The fusing metal preferably comprises a low-melting-point metal such as, for instance, as mercury, sodium, potassium, other alkali metals, or other low-melting-point metals or alloys.

The flange portions 14C, 15C of the electrodes 14, 15 each have a pair of washers 17, 18 against the flange portions 14C, 15C respectively. The washer 17 is of high-temperature resistant resilient material such as silicone rubber. The washer 18 is preferably composed of aluminum.

A generally cylindrical ceramic member 19 is positioned against each of the washers 18. Each of the ceramic members 19 has a central opening 20 therethrough to allow the corresponding electrode 14, 15, to pass therethrough. The opening 20 through each ceramic member 19 has a first straight-sided portion 20A (see FIG. 1A) which closely receives a part of the unthreaded stem portion 14B, 15B, of the corresponding electrode 14, 15. The opening 20 through each ceramic member 19 also has a tapered or outwardly-flaring portion 20B (see FIG. 1A) for a purpose to be described.

The assembly thus far described, comprising the central ceramic body 10, the washers 12, the flange portions 14C, 15C of the electrodes 14, 15, the pairs of washers 17, 18, and the ceraMic bodies 19, all are circular or cylindrical in shape, and have equal outer diameters, as shown, presenting a straight-sided cylindrical assembly when put together as shown. All of the aforesaid members are closely fitted into an axial hole or bore 22A, of a generally cylindrical or tubular ceramic member 22.

The outer diameter of the ceramic member 22 is tapered, for a purpose to be described, from a small diameter at the left end as viewed in FIG. 1 to a large diameter at the right end.

For the purpose of providing a high radially inward compressive force and support for the components thus far described, an outer supporting steel jacket or sleeve 24 is provided. The jacket 24 is generally cylindrical or tubular and has a tapered internal bore or hole 24A closely receiving the ceramic body 22. Thus the inner diameter of the bore 24A is also small at the left end as viewed in FIG. 1, and large at the right end. The jacket 24 is preferably constructed of a high-strength steel, such as the steel identified as "Marvac 18A," manufactured and sold by Latrobe Steel Co.

For the purpose of holding the parts described and shown in place within the outer jacket 24, a pair of retaining plugs 25, 26 is provided, which are threaded into enlarged tapped end portions of the opening 24A through the jacket 24. A copper-clad stainless steel washer 27 is positioned between the end of each of the plugs 25, 26, and the opposing surfaces against which they exert a clamping pressure.

The parts are so dimensioned that the ceramic member 22 is tightly received within the jacket 24 such as by being pressed into it by a hydraulic press with high force, such, for example, as 12 tons. This forces the member 22 into high radial compression, which is transmitted to the member 10. This compression is balanced by corresponding high tensile force in the jacket 24. The plug members 25 and 26 serve to retain the parts in place, particularly the ceramic members 19.

For the purpose of preventing a strike-over, or passage of electric current between the electrodes 14, 15 without passing through the fusing metal 13 such as by a path including the jacket member 24, special insulating and sealing means is provided in accordance with the invention.

It will be observed that the plug members 25, 26 are in threaded engagement with the jacket or main enclosure member 24. In accordance with the invention, each of the plug members 25, 26 is insulated from the corresponding electrode 14, 15, by special molded insulating members 30, 31, cooperating with the ceramic members already described. Since, as shown in the drawing, the structure and assembly of the insulating members 30, 31, respectively, are the same, the structure and assembly of only one (member 30) will be described in detail.

Figure 2:
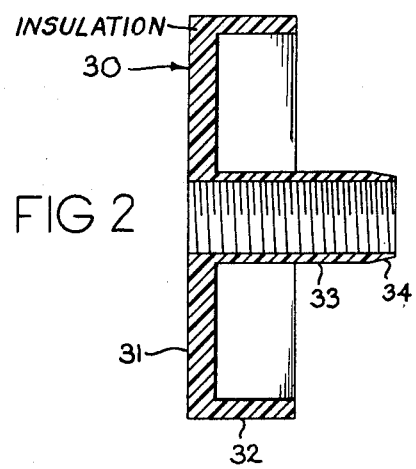
FIG. 2 is a sectional view of the sealing and insulating member of the invention.

Referring to FIG. 2, the insulating member 30 is shown in longitudinal section. As shown, the member 30 comprises a generally cup-shaped portion, made up of a disc-shaped portion 31 with an integral peripheral flange 32. The member 30 also includes a hollow stem portion 33, which is threaded internally to threadedly engage the electrode 14. The stem portion 33 has its free end tapered as shown at 34. As shown in the drawing (FIG. 1), the member 30 is threaded onto the electrode 14 until the end of the stem 33 engages the shoulder portion 14B of the electrode 14. Depending on manufacturing tolerance variations of the parts, the inner surface of the disc portion 31 may or may not be in tight contact with the outer end of the plug member 25. The flange portion 32, however, overlaps at least a portion of the outer surface of the jacket member 24, thus increasing the outer over-surface path between the jacket 24 and a retaining or lock nut 36 which also is threaded onto the electrode 14 and against the outer surface of the disc-shaped portion of the member 30.

Figure 1A:
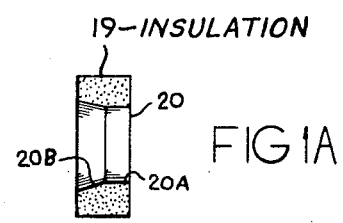
FIG. 1A is a sectional view of a refractory insulating member used in the invention.

The tapered end portion 34 of the stem 33 conforms to and fits against a tapered part 20B of the opening 20 in the ceramic member 19 (see FIG. 1A). Tightening of the member 30 on the threaded electrode 30 therefore wedges these parts into tight engagement with each other, and forces the stem 33 against the electrode 14. This effectively closed off the crack between the tapered end of the stem 33 and the ceramic member 19, to prevent strike-over between the electrode 14 and the washer 27 or the plug member 25 at this point. The tapered portion, which engages or overlaps the ceramic member 19, is also preferably made relatively long, to increase the length of this possible path.

It is also contemplated by the invention that in the form of the invention shown in FIG. 1 the inner surface of the stem 33 may be smooth (omitting the threading), and at least a substantial portion of the electrode 14 over which it fits also may be smooth. In this case, suitable locking means (not shown) would also be provided for the nut 36, such as lock-nut or integral locking means in the nut 36. If a connecting strap, not shown, is utilized which fits over the rod 14 and against the nut 36, a second nut would be used to hold this strap in place, and this would provide a locking function for the nut 36. It will be observed that in the form shown in FIG. 1 and described above, a locking action is provided by the inter-action of the member 30, which is threaded onto the shaft 14, and the nut 36 which is also threaded onto shaft 14 and abuts against the member 36.

When the parts are assembled, the inner and outer surfaces of the free end of the stem 33 are preferably coated with silicone grease or a comparable dielectric coating material. This serves to fill in any surface imperfections or gaps in the various abutting surfaces, since it is virtually impossible, on a reasonable cost basis, to manufacture parts which will fit together perfectly.

In operation, the device of FIG. 1 normally conducts current so long as the value of the current does not exceed a predetermined value, such, for example, as 30, 50, or 100 amperes, etc. If and when the predetermined amount of current is exceeded for a predetermined time, the temperature of the fuse metal 13 is raised beyond its melting point to its vaporizing point, at which time it changes from a relatively low resistance state to a relatively high resistance state, thus protecting elements connected in the circuit from the harmful effects of excessively high current.

In most typical applications, means will also be included in the circuit which responds to the occurrence of such overcurrent conditions to automatically cause an opening or interruption of the circuit. Such means may comprise any of a number of conventional types of circuit protective devices or "circuit breakers." While such a circuit breaker performs the interrupting function, the presence of a current limiting device of the type shown in FIG. 1 serves to relieve the circuit breaker from the necessity of having to interrupt excessively high short circuit currents.

Figure 3:
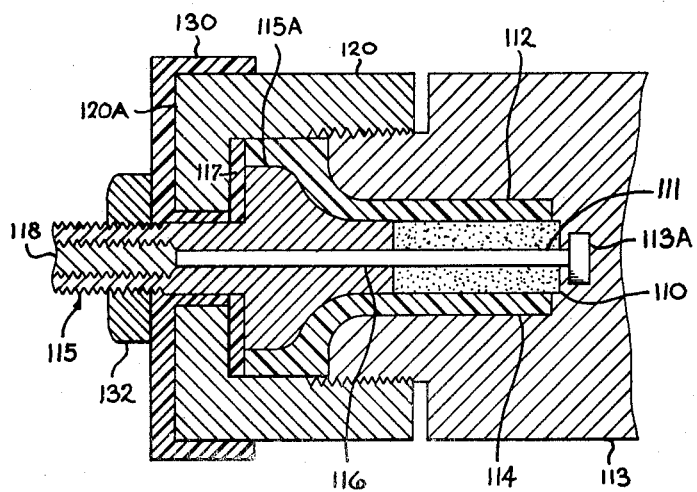
FIG. 3 is a sectional fragmentary view of another embodiment of the invention.

In the form of the invention shown in FIG. 3, a main ceramic body 110 is provided which is comparable to the ceramic body 10 of the form of FIG. 1. The ceramic body 110 has a central opening 111 therethrough. The ceramic body 110 is captured within a generally cylindrical recess or pocket 112 in a generally cylindrical metallic support and electrode member 113. The support member 113 has a chamber 113A formed therein with an opening which connects to the opening 111 of the ceramic body 110. An insulating filler material 114 is used to fill the space between the ceramic body 110 and the walls of the pocket 112.

Also extending into the pocket 112 is the end portion of an electrode member 115, which has an axial opening 116 in alignment with the opening 111 of the ceramic body 110. A suitable fuse metal material is used to fill the opening 111 and the adjacent chamber 113A, as well as the opening 116. The outer end portion of the opening 116 is enlarged and serves to receive a suitable sealing metal 118. The electrode 115 abuts against the ceramic body 110. The electrode 115 is held in position by means of a generally cup-shaped threaded metallic member 120 which threads onto the reduced portion of the body 113. The retaining member 120 has an end wall 120A, which overlaps a flange portion 115A of the electrode 115. The retaining member 120 is insulated from the electrode 115 in part by the insulation filler material 114 which extends flush with the flange portion 115A of the electrode 115.

The right-hand portion (not shown) of the current limiting device of FIG. 3 may be similar to the left-hand portion shown, or, if desired, may be simply terminated as a generally cylindrical electrode, serving as the outgoing electrode for the device. Suitable expansion-absorbing means such as shown in the above-mentioned Harris patent may be incorporated in either of the devices of FIGS. 1 or 3, if desired.

Since the retaining member 120 is in direct engagement at its threaded protion with the metallic body 113, insulation must be provided at all points between the retaining member 120 and the electrode 115. In part, this is provided by the insulation filler material 114 which has been described and the washer 117. In addition, in accordance with applicant's present invention, an insulation cap member 130 is also provided, which is generally comparable in structure and function to the cap member 30 of the form of FIG. 1. The cap member 130 is generally cup-shaped, and has a central hollow stem extending in the same general direction as the main side wall. In assembly, the parts are assembled as shown, with the retaining member 120 threaded onto the support body 113 to clamp the electrode 115 against the ceramic body 110. The fuse metal fill material is then introduced into the opening 116, to the opening 111 and chamber 113A, and the opening 116 is sealed by the sealing material 118.

Following this, the insulting cap member 130 is assembled as shown, and a retaining nut 132 is threaded onto the external portion of the electrode 115, clamping the insulating member 130 in place and pressing the ends of the hollow stem portion 120A against the insulation material insulating washer 117, to provide a complete and tight insulation seal between the electrode 115 and the retaining cap member 120. Suitable locking means, not shown, may also be used to retain the clamping nut 132 in place after it is tightened.

While the invention has been shown and described in two specific embodiments, it will be apparent that many modifications may readily be made. It is therefore intended by the appended claims to cover all such modifications as fall within the true spirit and scope of the invention.

I claim:

1. A repetitively-operable vapor-state current limiting device comprising:
    a. an insulating body having at least one hole therethrough;
    b. a fusing metal filling said hole in said insulating body;
    c. a pair of electrodes at opposite sides of said insulating body and in electrical contact with said fusing metal;
    d. a rigid metallic enclosure enclosing and supporting said insulating body;
    e. at least one of said electrodes comprising an elongated rod-like portion passing through an opening in said enclosure, and
    f. insulating means insulating at least said rod-like portion of said one electrode from said enclosure, said insulating means comprising a pre-formed insulating member having a central hollow stem portion closely surrounding said portion of said electrode and a generally planar portion extending in a plane substantially at right angles to said stem portion adjacent an external surface of said enclosure and a peripheral flange extending from said generally planar portion in the same direction as said stem portion and overlapping at least a portion of the outer surface of said metallic enclosure;
    g. said device also including an insulating member of refractory material having a hole therein receiving an inner portion of said one electrode, said stem portion of said insulating means including a tapered portion fitting closely against a correspondingly tapered portion of said hole in said refractory insulating member.

2. A repetitively operable vapor state current limiting device as set forth in claim 1, said device also including means clamping said insulating means inwardly against said tapered portion of said refractory insulating member.

* * * * *